(12) United States Patent
Fukunaga

(10) Patent No.: US 12,445,718 B2
(45) Date of Patent: Oct. 14, 2025

(54) IMAGE CAPTURING APPARATUS, CONTROL METHOD OF IMAGE CAPTURING APPARATUS, AND NON-TRANSITORY COMPUTER-READABLE STORAGE MEDIUM

(71) Applicant: CANON KABUSHIKI KAISHA, Tokyo (JP)

(72) Inventor: Kentaro Fukunaga, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 278 days.

(21) Appl. No.: 18/160,572

(22) Filed: Jan. 27, 2023

(65) Prior Publication Data
US 2023/0247283 A1    Aug. 3, 2023

(30) Foreign Application Priority Data

Jan. 31, 2022    (JP) .................. 2022-013586

(51) Int. Cl.
*H04N 23/66* (2023.01)
*H04N 23/663* (2023.01)

(52) U.S. Cl.
CPC ................. *H04N 23/663* (2023.01)

(58) Field of Classification Search
CPC .................................................... H04N 23/663
See application file for complete search history.

(56) References Cited

U.S. PATENT DOCUMENTS

| | | |
|---|---|---|
| 2011/0110656 A1 | 5/2011 | Hamada |
| 2019/0349505 A1 | 11/2019 | Tsuchiya |
| 2020/0026153 A1 | 1/2020 | Kawai |

(Continued)

FOREIGN PATENT DOCUMENTS

| | | |
|---|---|---|
| EP | 3796641 A1 | 3/2021 |
| JP | 2006-287736 A | 10/2006 |

OTHER PUBLICATIONS

European Search Report issued on Jun. 19, 2023, that issued in the corresponding European Patent Application No. 23153651.7.

(Continued)

*Primary Examiner* — Lin Ye
*Assistant Examiner* — Fayez A Bhuiyan
(74) *Attorney, Agent, or Firm* — Cowan, Liebowitz & Latman, P.C.

(57) ABSTRACT

An image capturing apparatus including a mounting part for enabling attachment and detachment of a device, comprising one or more processors, and one or more memories storing executable instructions which, when executed by the one or more processors, cause the image capturing apparatus to perform operations including, generating a command including a request for clock resetting for causing the device to reset a clock signal for processing to be used to execute analysis processing, transmitting, in a state where a device having a function of executing the analysis processing is attached to the mounting part, an image to the device, transmitting an execution instruction for executing the analysis processing on the image, and receiving a processing result of the analysis processing obtained according to the execution instruction, wherein the command is further transmitted to the device based on the processing result of the analysis processing.

15 Claims, 8 Drawing Sheets

(56) References Cited

U.S. PATENT DOCUMENTS

2021/0092269 A1\* 3/2021 Fukunaga ............ H04N 23/663
2021/0274079 A1 9/2021 Ise

OTHER PUBLICATIONS

Jun. 19, 2023 European Patent Office Search Report, that issued in European Patent Application No. 23153649.1.
J. Redmon et al. "YOLO9000: Better Faster Stronger", Computer Vision and Pattern Recognition (CVPR) 2016.

\* cited by examiner

IMAGE CAPTURING APPARATUS, CONTROL METHOD OF IMAGE CAPTURING APPARATUS, AND NON-TRANSITORY COMPUTER-READABLE STORAGE MEDIUM

BACKGROUND OF THE INVENTION

Field of the Invention

This disclosure relates to an image capturing apparatus, a control method of the image capturing apparatus, and a non-transitory computer-readable storage medium.

Description of the Related Art

In recent years, in various scenes, an image analysis is performed for detecting, tracking, estimating attribute, or the like of an object using an image captured by a monitoring camera, and image processing is performed such as estimating the number of objects based on a result of such an image analysis. Heretofore, such image processing has been performed by a high-performance computation apparatuses such as a PC or a server that executes actual image processing for a video which is taken by a monitoring camera and is transferred to the high-performance computation apparatuses. In contrast, as a result of improvement in processing ability of mobile computation apparatuses in recent years, image processing can be performed in a monitoring camera. The processing in the monitoring camera (image capturing apparatus) may be executed by a computation apparatus arranged in a monitoring camera body, for example. Also, by attaching a detachable device such as a USB in which a computation apparatus is arranged to a monitoring camera, the detachable device can execute at least a portion of processing performed in the monitoring camera.

Some detachable devices perform image processing operations using power and a clock signal that are supplied by an apparatus to which the detachable device is attached. However, there are apparatuses, among apparatuses such as PCs and cameras to which detachable devices are to be attached, that stop clock signal supply to the detachable devices when the CPU load increases. If the clock signal supply is stopped, image processing cannot be normally executed in the detachable device. Regarding this issue, in Japanese Patent Laid-Open No. 2006-287736, a technique is disclosed in which, when clock signal supply is stopped, the operation is resumed by switching to a clock signal for self-running.

With the technique disclosed in Japanese Patent Laid-Open No. 2006-287736, addition of a circuit for detecting that a clock signal is stopped and a configuration for switching to an operation using a clock signal for self-running are needed in the detachable device, and therefore the circuit scale increases.

SUMMARY OF THE INVENTION

Therefore, provided is an image capturing apparatus, to which a detachable device can be attached, that enables returning to a state in which image processing can be continued in the detachable device, even when clock signal supply is stopped, without incurring an increase in the circuit scale of the detachable device.

One aspect of embodiments relates to an image capturing apparatus including a mounting part for enabling attachment and detachment of a device, comprising one or more processors, and one or more memories storing executable instructions which, when executed by the one or more processors, cause the image capturing apparatus to perform operations including generating a command including a request for clock resetting for causing the device to reset a clock signal for processing to be used to execute analysis processing, transmitting, in a state where a device having a function of executing the analysis processing is attached to the mounting part, an image to the device, transmitting an execution instruction for executing the analysis processing on the image, and receiving a processing result of the analysis processing obtained according to the execution instruction, wherein t the command to the device is transmitted based on the processing result of the analysis processing.

Further features of the present invention will become apparent from the following description of exemplary embodiments (with reference to the attached drawings).

DESCRIPTION OF THE EMBODIMENTS

Figure 1:
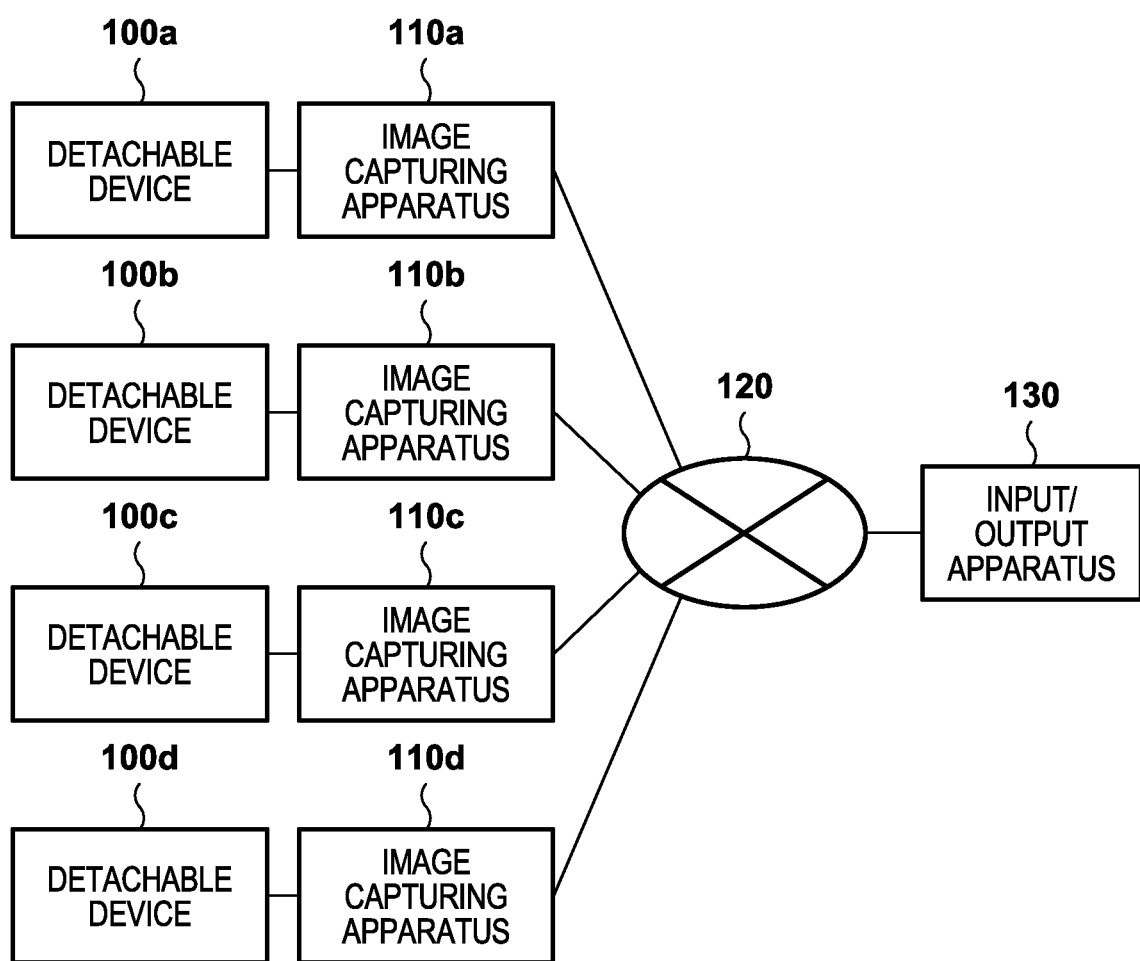
FIG. 1 is a diagram illustrating an example of a system configuration corresponding to embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

System Configuration

FIG. 1 shows an exemplary configuration of an image processing system of the present embodiment. The image processing system may be constructed as a system for tracking a specific person by analyzing captured images input from a plurality of image capturing apparatuses 110, for example. Note that the embodiment is not limited to this embodiment, and the image processing system may be constructed as any system that outputs predetermined information by analyzing an image. The image processing system includes image capturing apparatuses 110a to 110d, a network 120, and an input/output apparatus 130. The image capturing apparatuses 110a to 110d each include a slot to and from which a device that can record a captured image can be attached and detached, for example. The detachable devices 100a to 100d are inserted into the respective slots, and the image capturing apparatuses 110a to 110d are connected to the respective detachable devices 100a to 100d. Hereinafter, the detachable devices 100a to 100d may be collectively referred to as a "detachable device 100", and the image capturing apparatuses 110a to 110d may be collectively referred to as an "image capturing apparatus 110". The apparatuses that constitute the system will be described below.

The detachable device 100 is a computation device that is configured to be attached to and detached from the image capturing apparatus 110. The detachable device 100 can be configured as a device that is realized by mounting a predetermined processing circuit on a nonvolatile semiconductor memory device (e.g., SD card) that is configured to store an image captured by the image capturing apparatus 110, for example. SD card slots are prepared in many existing image capturing apparatuses 110 such as network cameras, and therefore an expanded function can be provided to an existing image capturing apparatus 110 by connecting the detachable device 100 thereto. For example, the detachable device 100 is configured to be entirely insertable into the image capturing apparatus 110, depending on the form of the SD card, and with this configuration, can be configured to be connectable to the image capturing apparatus 110 in a state in which no portion protrudes from the image capturing apparatus 110.

Also, for example, the detachable device 100 may be configured such that more than half of the detachable device 100 is insertable to the image capturing apparatus 110, and with this configuration, may be configured to be connectable to the image capturing apparatus 110 in a state in which a small portion protrudes from the image capturing apparatus 110. Accordingly, the detachable device 100 can be prevented from interfering with an obstacle such as wiring, and the convenience at the time of using the device can be improved.

Also, the detachable device 100 may also be configured to, other than the form of the SD card, be attached to the image capturing apparatus 110 with any interface that is used when a storage apparatus that can store at least an image captured by the image capturing apparatus 110 is attached. For example, the detachable device 100 may also be configured to include a Universal Serial Bus (USB) interface, and be attached to a USB socket of the image capturing apparatus 110. Moreover, the predetermined processing circuit to be mounted on the detachable device 100 can be implemented by a field programmable gate array (FPGA) that is programmed to execute predetermined processing, for example, but may also be implemented in another form.

The image capturing apparatus 110 is an image capturing apparatus such as a network camera, and can provide a captured image to the input/output apparatus 130 via the network 120. In the present embodiment, the image capturing apparatus 110 is assumed to incorporate a computation apparatus that can process a captured image, but there is no limitation to this configuration. For example, an external computer such as a personal computer (PC) that is connected to the image capturing apparatus 110 may also be present, and the combination of these apparatuses may also be treated as the image capturing apparatus 110. Also, in the present embodiment, it is assumed that the detachable devices 100 are attached to all of the image capturing apparatuses 110, respectively. In FIG. 1, four image capturing apparatuses 110 and detachable devices that are respectively attached thereto are illustrated, but the number of combinations of these apparatuses may be three or less, or may be five or more.

As a result of attaching the detachable device 100, to the image capturing apparatus 110, that has an image analysis processing function such as image analysis, image analysis or the like can be executed in the image capturing apparatus 110, even though the image capturing apparatus 110 does not have an image analysis processing function such as image analysis. A specific example of the analysis processing will be described later. Also, in a mode in which a computation apparatus for image processing is arranged in the image capturing apparatus 110, as in the present embodiment, as a result of attaching a detachable device 100 in which a computation apparatus is arranged to the image capturing apparatus 110, it becomes possible to use the computation apparatus of the detachable device 100 along with the own computation apparatus of the image capturing apparatus 110, and as a result, the variety and level of image processing that can be executed in the image capturing apparatus 110 can be increased.

The input/output apparatus 130 is an apparatus for receiving inputs from a user of the system and outputting information to the user (e.g., display of information). In the present embodiment, the input/output apparatus 130 can be a computer such as a PC, for example, and as a result of a browser or a native application installed in the computer being executed by the incorporated processor, input/output of information is performed. The image capturing apparatus 110 and the input/output apparatus 130 are communicably connected via the network 120. The network 120 includes a plurality of routers that satisfies a communication standard such as the Ethernet (registered trademark), switches, cables, and the like, for example. In the present embodiment, the network 120 may be any network that enables communication between the image capturing apparatus 110 and the input/output apparatus 130, and may be constructed with any scale, configuration, and communication standard to which the network is conformable. For example, the network 120 may be the Internet, a wired local area network (LAN), a wireless LAN, a wide area network (WAN), or the like. Also, the network 120 may be configured to perform communication with a communication protocol conforming to the Open Network Video Interface Forum (ONVIF) standard, for example. Note that there is no limitation to this configuration, and the network 120 may also be configured to perform communication with another communication protocol such as the original communication protocol, for example.

Apparatus Configuration

Configuration of Image Capturing Apparatus

Figure 2:
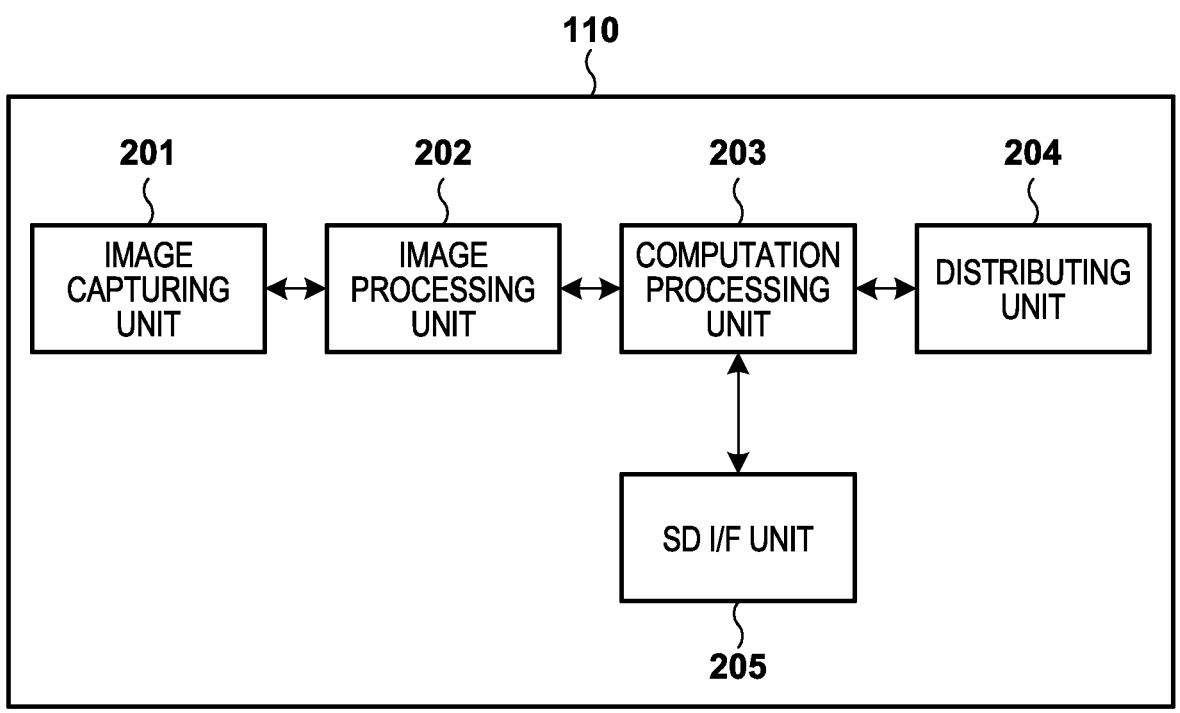
FIG. 2 is a diagram illustrating an example of a hardware configuration of an image capturing apparatus corresponding to the embodiments.

Next, an exemplary configuration of the image capturing apparatus 110 will be described with reference to FIG. 2. FIG. 2 is a diagram illustrating an exemplary hardware configuration of the image capturing apparatus 110. The image capturing apparatus 110 includes an image capturing unit 201, an image processing unit 202, a computation processing unit 203, a distributing unit 204, an SD I/F unit 205, as its hardware configuration, for example. I/F is an abbreviation of interface.

The image capturing unit 201 includes a lens unit for forming an image by light and an image sensor for performing analog signal conversion in accordance with light with which an image is formed. The lens unit has a zoom function for adjusting the angle of view, a diaphragm function for adjusting the light amount, and the like. The image sensor has a gain function for performing sensitivity adjustment when light is converted to an analog signal. These functions are adjusted based on setting values notified from the image processing unit 202. The analog signal generated by the image capturing unit 201 is converted to a digital signal by an analog to digital conversion circuit, and the digital signal is transferred to the image processing unit 202 as an image signal.

The image processing unit 202 includes an image processing engine, peripheral devices thereof, and the like. The peripheral device includes random access memory (RAM), I/F drivers, and the like, for example. The image processing unit 202 generates image data by performing image processing such as developing processing, filtering processing, sensor correction, noise removal, and the like on the image signal acquired from the image capturing unit 201, for example. Also, the image processing unit 202 transmits setting values to the lens unit and the image sensor, and may execute exposure adjustment such that an appropriate exposure image can be acquired. The image data generated by the image processing unit 202 is transferred to the computation processing unit 203.

The computation processing unit 203 includes one or more processors such as CPU and MPU, memories such as RAM and ROM, I/F drivers, and the like. Note that CPU is an acronym of Central Processing Unit, MPU is an acronym of Micro Processing Unit, and ROM is an acronym of Read Only Memory. The computation processing unit 203 executes various types of processing such as control and computation that are needed for the operations of the image capturing apparatus 110. Also, in one example, assignment of portions of processing to be executed in the system described above to the image capturing apparatus 110 and the detachable device 100 for execution is determined, and the image capturing apparatus 110 and the detachable device 100 may execute the processing according to the determined assignment. The details of the processing contents and the assignment of processing will be described below. An image received from the image processing unit 202 is transferred to the distributing unit 204 or the SD I/F unit 205. Also, the processing result data is also transferred to the distributing unit 204.

The distributing unit 204 includes a network distribution engine and peripheral devices such as RAM and an ETH PHY module, for example. The ETH PHY module is a module for executing processing of the Ethernet physical (PHY) layer. The distributing unit 204 coverts the image data and processing result acquired from the computation processing unit 203 to a format for enabling distribution to the network 120, and outputs the converted data to the network 120.

The SD I/F unit 205 is an interface portion for connection with the detachable device 100, and includes a mounting part such as a socket for attachment/detachment of a power supply and the detachable device 100, for example. Here, it is assumed that the SD I/F unit 205 is configured following the SD standard defined by the SD Association. The communication between the detachable device 100 and the image capturing apparatus 110 such as transferring an image acquired from the computation processing unit 203 to the detachable device 100 and acquiring data from the detachable device 100 is performed through the SD I/F unit 205.

Figure 3:
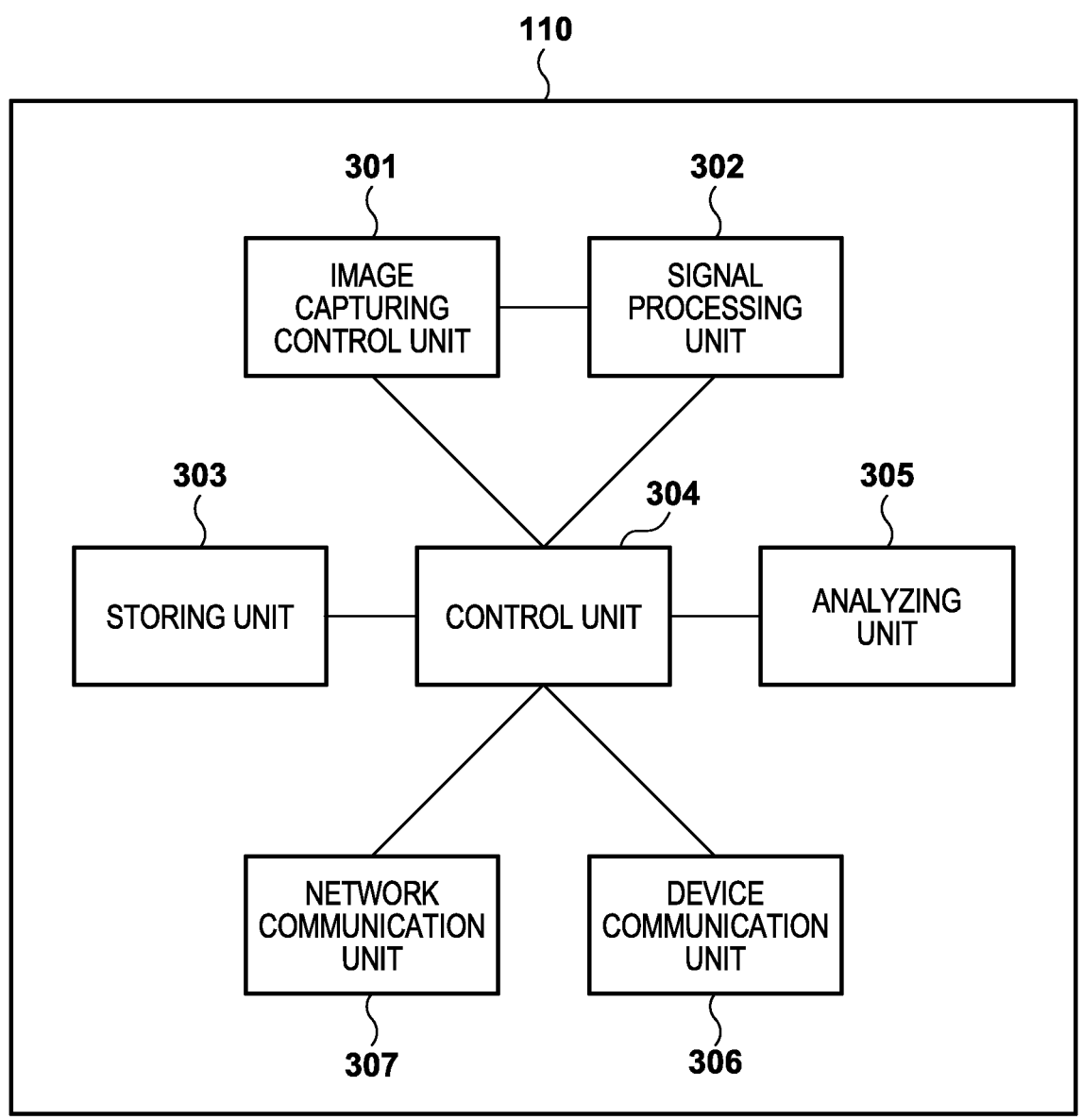
FIG. 3 is a diagram illustrating an example of a functional configuration of the image capturing apparatus corresponding to the embodiments.

Next, an exemplary functional configuration of the image capturing apparatus 110 will be described with reference to FIG. 3. The image capturing apparatus 110 includes an image capturing control unit 301, a signal processing unit 302, a storing unit 303, a control unit 304, an analyzing unit 305, a device communication unit 306, and a network communication unit 307, as its functional units.

The image capturing control unit 301 corresponds to the one or more processors such as CPU and MPU in the computation processing unit 203, and executes control to capture images of the surrounding environment via the image capturing unit 201. The signal processing unit 302 corresponds to the image processing unit 202, and generates captured image data by performing predetermined processing on an image captured by the image capturing control unit 301. In the following, the captured image data is simply referred to as a "captured image". The signal processing unit 302 encodes the image captured by the image capturing control unit 301, for example. The signal processing unit 302 encodes still images using an encoding system such as the Joint Photographic Experts Group (JPEG), for example. Also, the signal processing unit 302 encodes moving images using an encoding system such as H.264/MPEG-4 AVC (referred to as "H.264" below) or High Efficiency Video Coding (HEVC). Also, the signal processing unit 302 may encode images using an encoding system selected by a user from a plurality of preset encoding systems, via an operation unit (unshown) of the image capturing apparatus 110, for example.

The storing unit 303 corresponds to various storage apparatuses included in the image processing unit 202 and the computation processing unit 203, and stores a list of analysis processing that can be executed in the analyzing unit 305 and a list of postprocessing for analysis processing results. Also, the storing unit 303 can store a test image whose analysis processing result is known, and also the analysis processing result. Note that, in the present embodiment, the image processing to be executed is analysis processing, but any processing may also be executed, and the storing unit 303 stores an analysis processing list and a postprocessing list regarding processing related to the processing to be executed.

The control unit 304 corresponds to one or more processors such as CPU and MPU in the computation processing unit 203, and controls the signal processing unit 302, the storing unit 303, the analyzing unit 305, the device communication unit 306, and the network communication unit 307 such that each of them executes predetermined processing. Also, the control unit 304 determines the load state of processing that is being executed in the image capturing apparatus 110, and if it is determined that the load is high, performs control such that clock signal supply from the device communication unit 306 to the detachable device 100 is stopped, and the like.

The analyzing unit 305 corresponds to one or more processors such as CPU and MPU in the computation processing unit 203, and selects image processing to be executed on a captured image from at least any of preprocessing for analysis, analysis processing, and postprocessing for analysis, which will be described later, and executes the selected image processing. The preprocessing for analysis is image processing to be executed on a captured image before executing the later-described analysis processing. It is assumed that, in the preprocessing for analysis of the present embodiment, processing for creating divided images by dividing a captured image is to be executed, as an example. The analysis processing is image processing for analyzing an input image and outputting information obtained by the analysis.

It is assumed that, in the analysis processing of the present embodiment, processing is executed in which at least any of human body detection processing, face detection processing, and vehicle detection processing is executed using the divided images obtained by the preprocessing for analysis as an input, and the analysis processing result is output, as an example. The analysis processing may be image processing configured to output the position of an object included in divided images using a machine learning model subjected to learning so as to be able to detect an object included in an image using a technique described in "J. Redmon, A. Farhadi "YOLO9000: Better Faster Stronger", Computer Vision and Pattern Recognition (CVPR) 2016", for example.

That is, the image processing includes analysis processing using a trained neural network that can perform feature extraction for detecting a predetermined object. The postprocessing for analysis is image processing that is executed after the analysis processing has been executed. It is assumed that, in the postprocessing for analysis of the present embodiment, image processing is executed in which a value obtained by adding up the number of objects detected in divided images is output as the processing result, based on the results of analysis processing performed on the divided images, for example. Note that the analysis processing may also be processing in which an object in an image is detected by performing pattern matching, and the position of the object is output.

The device communication unit 306 corresponds to the SD I/F unit 205, performs communication with the detachable device 100, and supplies a clock signal for generating a later-described clock signal for processing to the detachable device 100. The device communication unit 306 converts the format of input data to a format that the detachable device 100 can process, and transmits the data obtained by the conversion to the detachable device 100. Also, the device communication unit 306 receives data from the detachable device 100, and converts the format of the received data to a format that the image capturing apparatus 110 can process. In the present embodiment, it is assumed that the device communication unit 306 executes processing for converting decimals between a floating point format and a fixed point format, but there is no limitation to this type of processing, and another processing may also be executed by the device communication unit 306. Also, in the present embodiment, it is assumed that the device communication unit 306 performs communication with the detachable device 100 by transmitting a request (or, command, command sequence) determined in advance in the range of the SD standard to the detachable device 100, and receiving a response from the detachable device 100. The network communication unit 307 corresponds to the distributing unit 204, and performs communication with the input/output apparatus 130 via the network 120.

Configuration of Detachable Device

Figure 4:
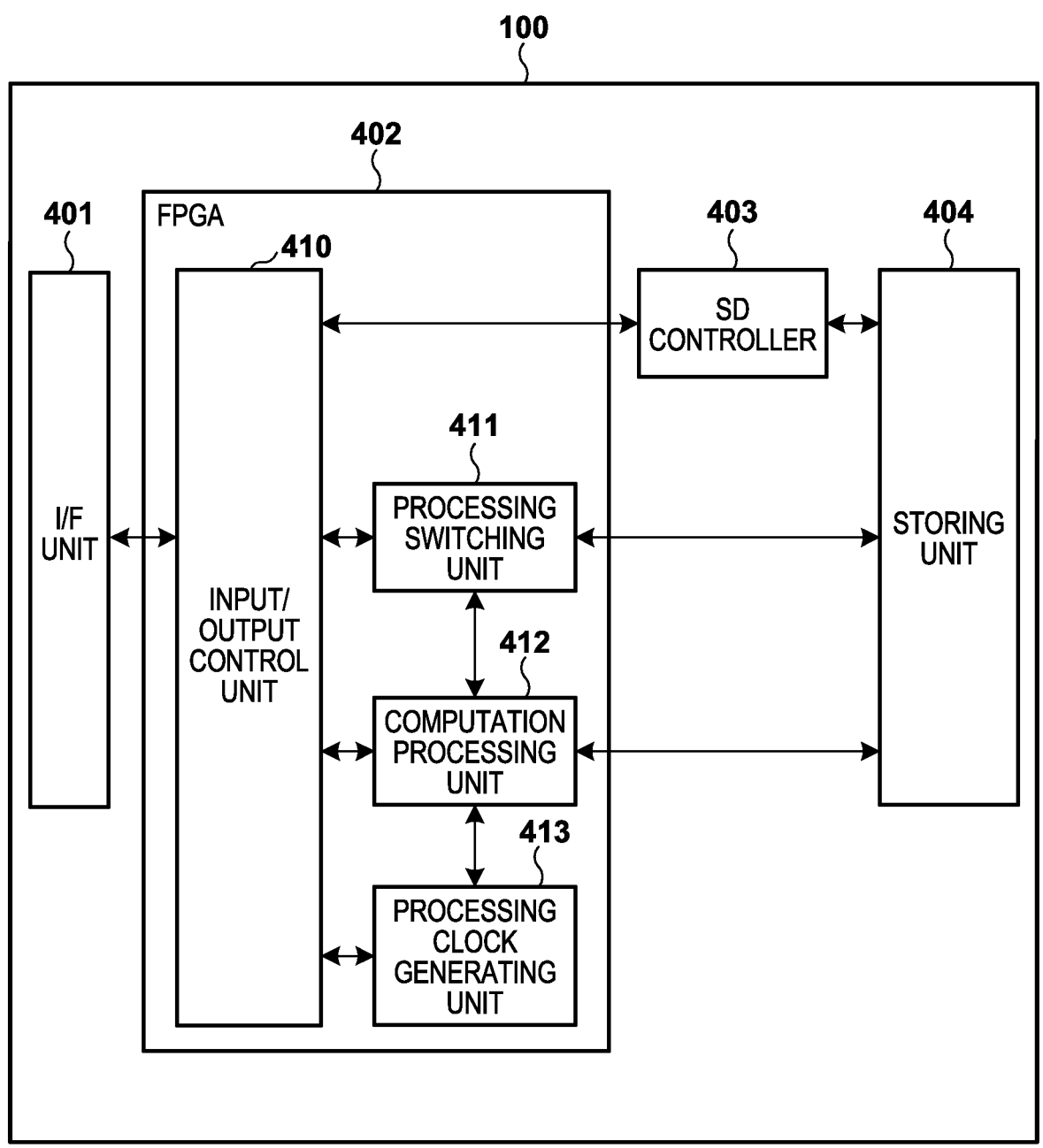
FIG. 4 is a diagram illustrating an example of a hardware configuration of a detachable device corresponding to the embodiments.

Next, an exemplary hardware configuration of the detachable device 100 will be described with reference to FIG. 4. The detachable device 100 includes an I/F unit 401, an FPGA 402, an SD controller 403, and a storing unit 404, for example. It is assumed that the detachable device 100 is formed with a shape for enabling insertion and removal to and from the socket of the SD I/F unit 205 included in the image capturing apparatus 110, that is, formed with a shape conforming to the SD standard.

The I/F unit 401 is an interface portion for connecting the detachable device 100 to an apparatus such as the image capturing apparatus 110. The I/F unit 401 includes electrical contact terminals and the like, receives supply of power from the image capturing apparatus 110, and generates and distributes power supplies to be used in the detachable device 100, for example. It is assumed that, similarly to the SD I/F unit 205 of the image capturing apparatus 110, regarding items defined in the SD standard, the I/F unit 401 follows (in conformity to) the definitions. Reception of images and setting data from the image capturing apparatus 110 and transmission of data from the FPGA 402 to the image capturing apparatus 110 are executed via the I/F unit 401.

The FPGA 402 includes an input/output control unit 410, a processing switching unit 411, a computation processing unit 412, and a processing clock signal generating unit (a processing clock signal generator) 413. The FPGA 402 is one type of semiconductor device whose internal logic circuit structure can be repeatedly reconfigured. A processing function can be added (provided) to an apparatus on which the detachable device 100 is mounted by processing realized by the FPGA 402. Also, with the reconfiguring function of the FPGA 402, the logic circuit structure can be changed later, and therefore, by attaching the detachable device 100 to an apparatus in a field in which technical advancement is rapid, the apparatus can execute appropriate processing at an appropriate time, for example.

In the present embodiment, an example in which an FPGA is used is described, but a general-purpose ASIC or a dedicated LSI may also be used, as long as later-describing processing can be realized, for example. The FPGA 402 is started by writing into setting data including information regarding the logic circuit structure to be generated from a dedicated I/F, or by reading out the setting data from the dedicated I/F. In the present embodiment, it is assumed that the setting data is retained in the storing unit 404. Upon turning on a power supply, the FPGA 402 reads out the setting data from the storing unit 404, generate a logic circuit, and then starts. Note that there is no limitation to this configuration, and a configuration may also be adopted in which, by implementing a dedicated circuit in the detachable device, the image capturing apparatus 110 writes setting data into the FPGA 402 via the I/F unit 401, for example.

The input/output control unit 410 includes a circuit for transmitting and receiving images to and from the image capturing apparatus 110, a circuit for analyzing a command received from the image capturing apparatus 110, a circuit for performing control based on the analyzed result, and the like. The commands here are defined in the SD standard, and the input/output control unit 410 can detect some of the defined commands. The details of the functions will be described later. The input/output control unit 410 performs control such that, in the case of storing processing, an image is transmitted to the SD controller 403, and in the case of image analysis processing, an image is transmitted to the computation processing unit 412. Also, the input/output control unit 410, upon receiving setting data for switching processing, transmits the setting data to the processing switching unit 411.

The processing switching unit 411 includes circuits for acquiring information regarding an image analysis processing function from the storing unit 404 based on setting data received from the image capturing apparatus 110, and for writing the information into the computation processing unit 412. The information regarding the image analysis processing function is a setting parameter indicating the sequence and type of computation to be processed in the computation processing unit 412 and computation coefficients, for example. The computation processing unit 412 includes a plurality of computation circuits that are needed to execute the image analysis processing function. The computation processing unit 412 executes computation processing based on information regarding the image analysis processing function received from the processing switching unit 411, and transmits the processing result to the image capturing apparatus 110, and/or stores the processing result in the storing unit 404.

The processing clock signal generating unit 413 is constituted by a phase locked loop (PLL) or the like for speeding up the computation processing, and generates a high-speed clock signal (hereinafter, a clock signal for processing) by clocking up the clock signal supplied from the image capturing apparatus 110 via the input/output control unit 410. The computation processing unit 412 executes processing using the clock signal for processing generated by the processing clock signal generating unit 413. Therefore, if the clock signal supply from the image capturing apparatus 110 stops for a long period of time, the clock signal for processing generated by the processing clock signal generating unit 413 oscillates and becomes unstable, and as a result, the processing in the computation processing unit 412 cannot be performed normally. Also, if the clock signal supply is stopped for a long period of time when a high-speed clock signal is generated, it is possible that the high-speed clock signal generated by the PLL is not resumed by simply restarting the clock signal supply, and normal processing is not returned to be executed. Note that the input/output control unit 410 uses the clock signal supplied from the image capturing apparatus 110 for communication as is, and therefore even in a state in which the clock signal for processing becomes unstable, exchange of command/data with the image capturing apparatus 110 is possible via the I/F unit 401.

The FPGA 402 extracts setting data of a processing function to be executed that is included in setting data corresponding to a plurality of processing functions that are retained in advance, and rewrites processing contents to be executed by the computation processing unit 412 based on the extracted setting data. Accordingly, the detachable device 100 can selectively execute at least one of the plurality of processing functions. Also, as a result of adding setting data for processing that is newly added as appropriate, latest processing can be executed in the image capturing apparatus 110. Note that, in the following, the fact that a plurality of pieces of setting data respectively corresponding to the plurality of processing functions are included is expressed as including the plurality of processing functions. That is, even in a state in which the FPGA 402 of the detachable device 100 is configured to execute one processing function, if the processing contents of the computation processing unit 412 can be changed with setting data for another processing function, this fact is expressed as including a plurality of processing functions.

The SD controller 403 is a known control Integrated Circuit (IC) such as one defined in the SD standard, and executes control of a slave operation according to the SD protocol, and data read/write control for storing unit 404. The storing unit 404 is constituted by a NAND-type flash memory, for example, and stores various types of information such as storage data written into by the image capturing apparatus 110, information regarding an image analysis processing function to be written into the computation processing unit 412, setting data of the FPGA 402, and circuit data for analysis.

Figure 5:
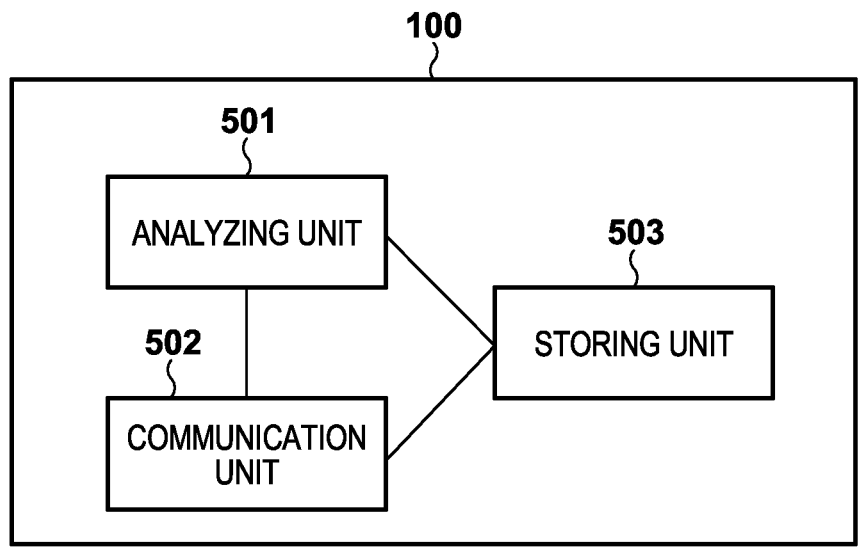
FIG. 5 is a diagram illustrating an example of a functional configuration of the detachable device corresponding to the embodiments.

Next, an exemplary functional configuration of the detachable device 100 will be described with reference to FIG. 5. The detachable device 100 includes an analyzing unit 501, a communication unit 502, and a storing unit 503, as its functional configuration, for example. The analyzing unit 501 executes various types of image processing (computation processing) including analysis processing on an image. The analyzing unit 501 corresponds to the FPGA 402, and upon receiving input of a setting request of analysis processing from the image capturing apparatus 110, configures setting for entering a state in which the analysis processing is executable, for example. The setting request of analysis processing can include information for designating the type of analysis processing to be made executable, and the analyzing unit 501 configures setting for making the type of analysis processing designated by the setting request executable. Also, the analyzing unit 501, upon receiving input of an image, executes the analysis processing that is set to be executable on the input image. The communication unit 502 corresponds to the I/F unit 401, and performs communication with the image capturing apparatus 110. The storing unit 503 corresponds to the SD controller 403 and the storing unit 404, stores image data received from the image capturing apparatus 110, and is also used as a work area for image processing in the analyzing unit 501. In the present embodiment, the configuration is such that the result of analysis processing in the analyzing unit 501 is stored as appropriate in the storing unit 503, even in a middle of processing.

In the present embodiment, the types of executable analysis processing include human body detection processing and face detection processing, but the example of executable analysis processing is not limited thereto. For example, the executable analysis processing may also be processing for determining whether or not an input image includes a subject (person, vehicle, object, or the like) stored in the storing unit 503 in advance, for example. Specifically, a matching degree between an image feature amount of a person stored in advance and an image feature amount of a person detected from the input image is calculated, and if the matching degree is a threshold value or more, it can be determined that the person stored in advance is present. Also, for the purpose of privacy protection, the executable analysis processing may also be processing of superimposing a predetermined mask image or performing mosaic processing on a person, an object, a region, or the like that has been detected from the input image. Also, the executable analysis processing may also be processing for detecting whether or not a person in an image is performing a specific action, using a learning model that has been subjected to learning regarding the specific action of a person by machine learning. Furthermore, the executable analysis processing may also be processing for determining what type of region is the region in an image. For example, the executable analysis processing may also be processing for determining what type of region is the region in an image using a learning model that has been subjected to learning regarding a building, a road, person, the sky, and the like by machine learning.

As described above, the executable analysis processing can be applied to image analysis processing using machine learning, and also to image analysis processing in which machine learning is not used. Also, the analysis processing described above may also be executed in cooperation with the image capturing apparatus 110, instead of being performed by the detachable device 100 independently.

Resetting of Clock Signal for Processing by Command

Figure 6:
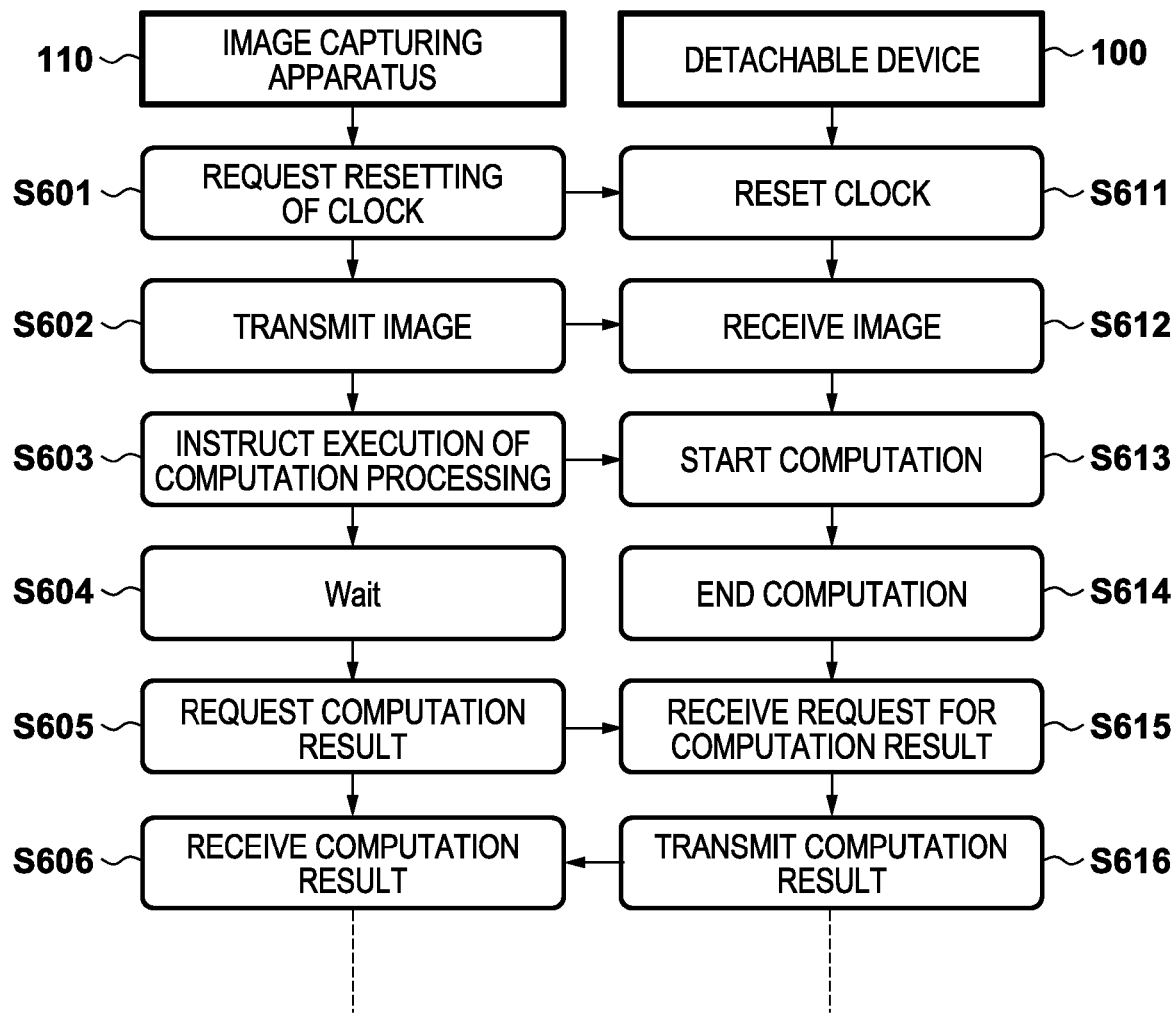
FIG. 6 is a flowchart illustrating an example of processing for resetting a clock signal for image processing corresponding to the embodiments.

Next, the processing flow for resetting a clock signal for processing generated in the processing clock signal generating unit 413 will be described with reference to the flowchart in FIG. 6. The processing corresponding to the flowchart can be realized, in the image capturing apparatus 110, by one or more processors (CPU, MPU, and the like) that function as the control unit 304 executing a corresponding program (stored in a memory that functions as the storing unit 303), for example. Also, in the detachable device 100, the processing corresponding to the flowchart can be realized by the FPGA 402 that is started after reading out corresponding setting data from the storing unit 404 and generating the logic circuit.

First, in step S601, the control unit 304 of the image capturing apparatus 110 issues a clock resetting command for requesting the detachable device 100 to reset the clock signal for processing via the device communication unit 306. Upon receiving the clock resetting command for resetting a high-speed clock signal via the I/F unit 401, in step S611, the input/output control unit 410 outputs a signal for resetting a PLL that constitutes the processing clock signal generating unit 413, and regenerates the clock signal for processing.

Figure 7:
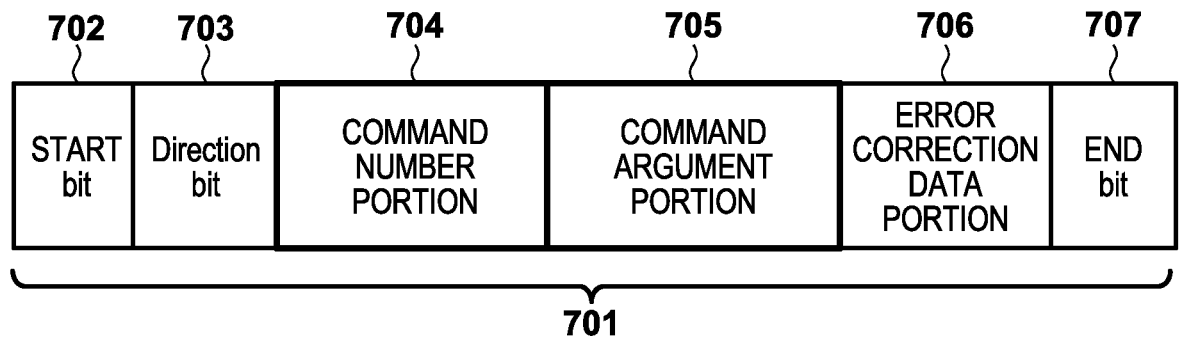
FIG. 7 is a diagram illustrating an example of a data configuration of a command for resetting the clock signal for image processing corresponding to the embodiments.

As shown in FIG. 7, an SD command 701 is constituted by STARTbit 702, Directionbit 703, a command number portion 704, a command argument portion 705, an error correction data portion 706, ENDbit 707, and the like. The clock resetting command may be issued by setting a number different from known SD commands to the command number portion 704, or by embedding a reset request flag in a portion set as reserve in the command argument portion 705 using a known command, for example.

Next, in step S602, the control unit 304 of the image capturing apparatus 110 transmits a captured image for image processing to the detachable device 100 via the device communication unit 306. In step S612, the communication unit 502 that has received the captured image outputs the captured image to the analyzing unit 501. In step S603 next, the control unit 304 of the image capturing apparatus 110 issues an execution instruction command for instructing execution of computation processing via the device communication unit 306. The communication unit 502 that has received the execution instruction command outputs the execution instruction command to the analyzing unit 501. In step S613, the computation processing unit 412, upon receiving the execution instruction command, executes the computation processing on the already-received captured image, and in step S614, ends the processing. The image processing such as analysis processing that is set operable in response to an analysis processing setting request that has received in advance as described above corresponds to the computation processing.

In step S604 next, the image capturing apparatus 110 waits for a period of time needed for computation processing in the analyzing unit 501 (computation processing unit 412). The wait time may be retained in the image capturing apparatus 110 in advance as information, or may also be read out from the detachable device 100 before starting processing. In step S605 next, the control unit 304 of the image capturing apparatus 110 issues an output request command for requesting output of a computation result via the device communication unit 306. The communication unit 502 that has received the output request command in step S615 outputs the command to the analyzing unit 501. In step S616 next, in response to the output request command, the analyzing unit 501 outputs the computation result to the communication unit 502, and the communication unit 502 outputs the received computation result to the image capturing apparatus 110. In step S606 next, the device communication unit 306 of the image capturing apparatus 110 receives the computation result output from the detachable device 100.

As described above, in the processing described in FIG. 6, in step S601, the clock resetting command is issued to the detachable device 100, and the clock signal for processing is reset and regenerated before starting computation. Accordingly, even in a case where clock signal supply from the image capturing apparatus 110 is stopped, and the clock signal for processing is unstable, the computation processing can be started in a state in which the processing clock signal is returned to normal, and therefore the computation processing can be normally executed.

Second Embodiment

Detection of Clock Signal for Processing being Unstable

In the above embodiment, processing in which the clock signal for processing is reset before starting computation in the detachable device 100 has been described. In contrast, when the fact that the clock signal for processing becomes unstable is detected while computation processing is undergoing in a detachable device 100, the clock signal for processing can also be reset. The processing of the present embodiment will be described below with reference to FIG. 8.

Figure 8:
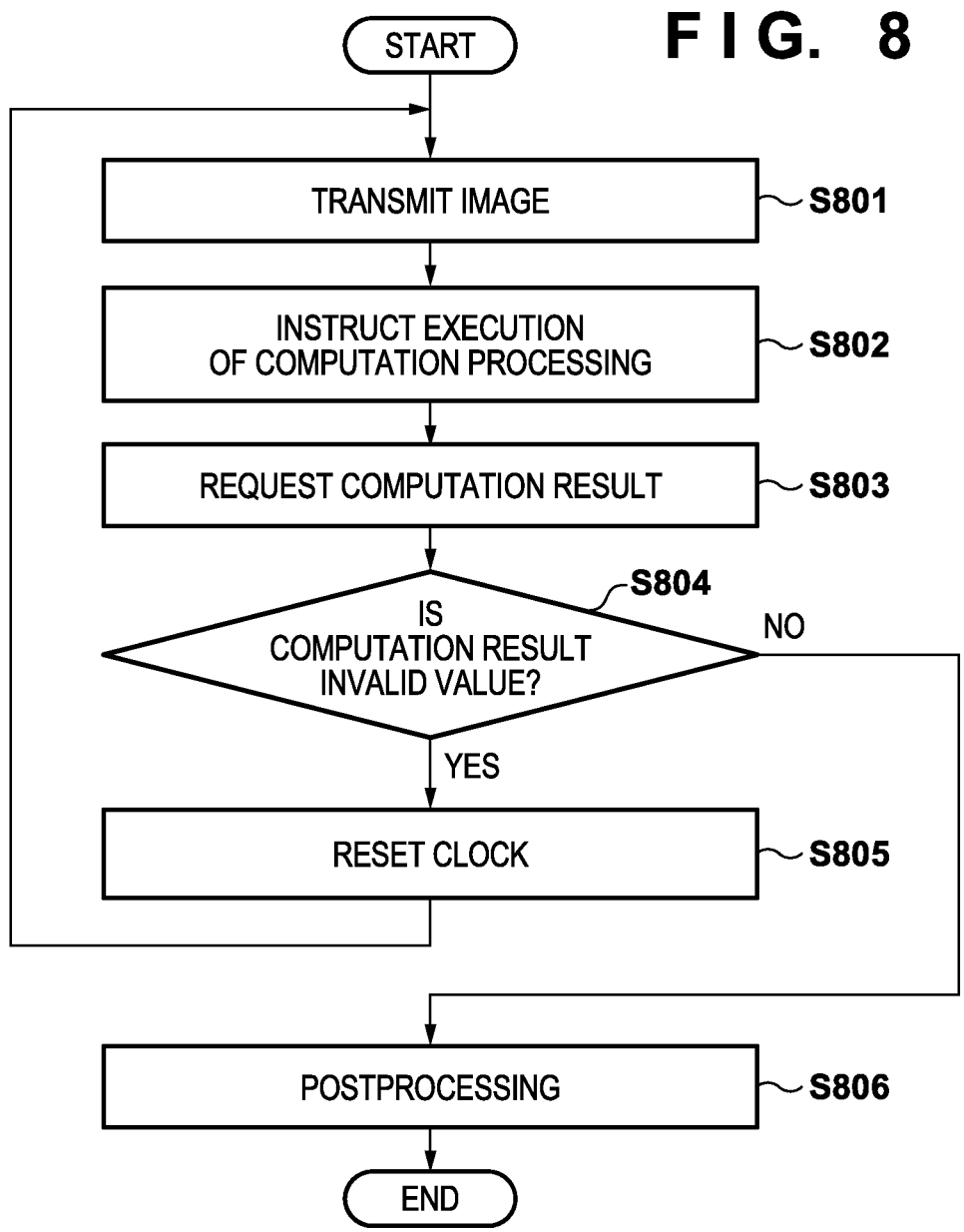
FIG. 8 is a flowchart illustrating an example of processing for resetting a clock signal for image processing based on an image processing result corresponding to a second embodiment.

An example of processing to be performed when the fact that the clock signal for processing has become unstable has been detected based on a computation result will be described with reference to FIG. 8. The processing corresponding to the flowchart can be realized, in an image capturing apparatus 110, by one or more processors (CPU, MPU, and the like) that function as a control unit 304 executing a corresponding program (stored in a memory that functions as the storing unit 303), for example. Also, although not illustrated in FIG. 8, the processing in the detachable device 100 can be realized by ab FPGA 402 that is started after reading out corresponding setting data from a storing unit 404 and generating the logic circuit.

First, in step S801, the control unit 304 of the image capturing apparatus 110 transmits a captured image for image processing to the detachable device 100 via a device communication unit 306. Next, in step S802, the control unit 304 of the image capturing apparatus 110 issues a command for instructing execution of computation processing to the detachable device 100 via the device communication unit 306, and causes the detachable device 100 to execute the computation processing on the captured image. In step S803, the control unit 304 of the image capturing apparatus 110 requests a computation result by issuing an output request command to the detachable device 100 via the device communication unit 306.

Upon receiving the computation result in response to the request, in step S804, the control unit 304 of the image capturing apparatus 110 determines whether or not the computation result output from the detachable device 100 is normal (or anomalous). Whether or not the computation result is normal can be determined based on whether or not the computation result takes an invalid value, for example. Here, the "invalid value" indicates a case where the output results are all values that cannot be output as computation results, such as 0x00 or 0xFF, a case where, although the captured image on which computation processing is performed has been changed, a value that is the same as the value of the previous computation result has been output, or the like. In the present embodiment, whenever computation processing is performed, the computation result is saved in the storing unit 404, and therefore when a value that is the same as the value of the previous computation result has been output, the computation processing itself has not been executed, and as a result, the computation result of the previous time is regarded as an invalid value. When the computation result is an invalid value, the computation result is regarded as being not normal (that is, anomalous). If it is determined that the computation result is an invalid value in step S804, the processing is advanced to step S805. In this case, the image capturing apparatus 110 regards that the clock signal for processing becomes unstable, and in step S805, the control unit 304 of the image capturing apparatus 110 issues a clock resetting command via the device communication unit 306, and again executes computation processing from step S801.

If it is determined that the computation result is not an invalid value in step S804, the processing is advance to step S806, and the image capturing apparatus 110 executes postprocessing. Processing such as displaying the computation result acquired from the detachable device 100 that is superimposed on an image can be performed as the postprocessing, for example.

As described above, in the present embodiment, an anomaly in the result of computation performed in the detachable device 100 is detected, resetting of the clock signal for processing is performed, and with this, the anomalous state can be resolved. Therefore, even if the clock signal for processing becomes unstable in the middle of computation in the detachable device 100, the clock signal is reset and the state can be returned to the normal state. On the other hand, when an anomaly in the computation result is not detected, resetting processing of the clock signal for processing need not be performed because the clock signal for processing is not unstable, and as a result, the overall processing time can be reduced.

Third Embodiment

Detection of Clock Signal for Processing being Unstable Using Test Image

In the second embodiment described above, processing has been described in which the clock signal for processing is reset based on an anomaly in the computation result detected while computation is being performed. In the second embodiment, an anomaly in the computation result is detected based on a specific value (0x00 or 0xFF), but a case is also envisioned in which unstableness of the clock signal for processing does not appear as a specific value. Therefore, in the present embodiment, a case will be described in which the fact that the clock signal for processing has become unstable is detected based on a result of computation performed on a test image. Here, the test image indicates image data for which the computation result in a detachable device 100 is determined (known) in advance. In the present embodiment, the known computation result is referred to as an "expected value". When the content of computation processing on an image to be executed by the detachable device 100 is the same, the results of the computation processing performed on the same image match. Therefore, when a computation result that is the same as the expected value is not returned, it can be estimated that an error incurred by unstableness of the clock signal for processing occurs, for example. In the present embodiment, an image for which the computation result is known is retained in a storing unit 303 of an image capturing apparatus 110 as a test image in advance. Also, the value of a computation result obtained by computation performed on the test image in advance can also be retained.

Figure 9:
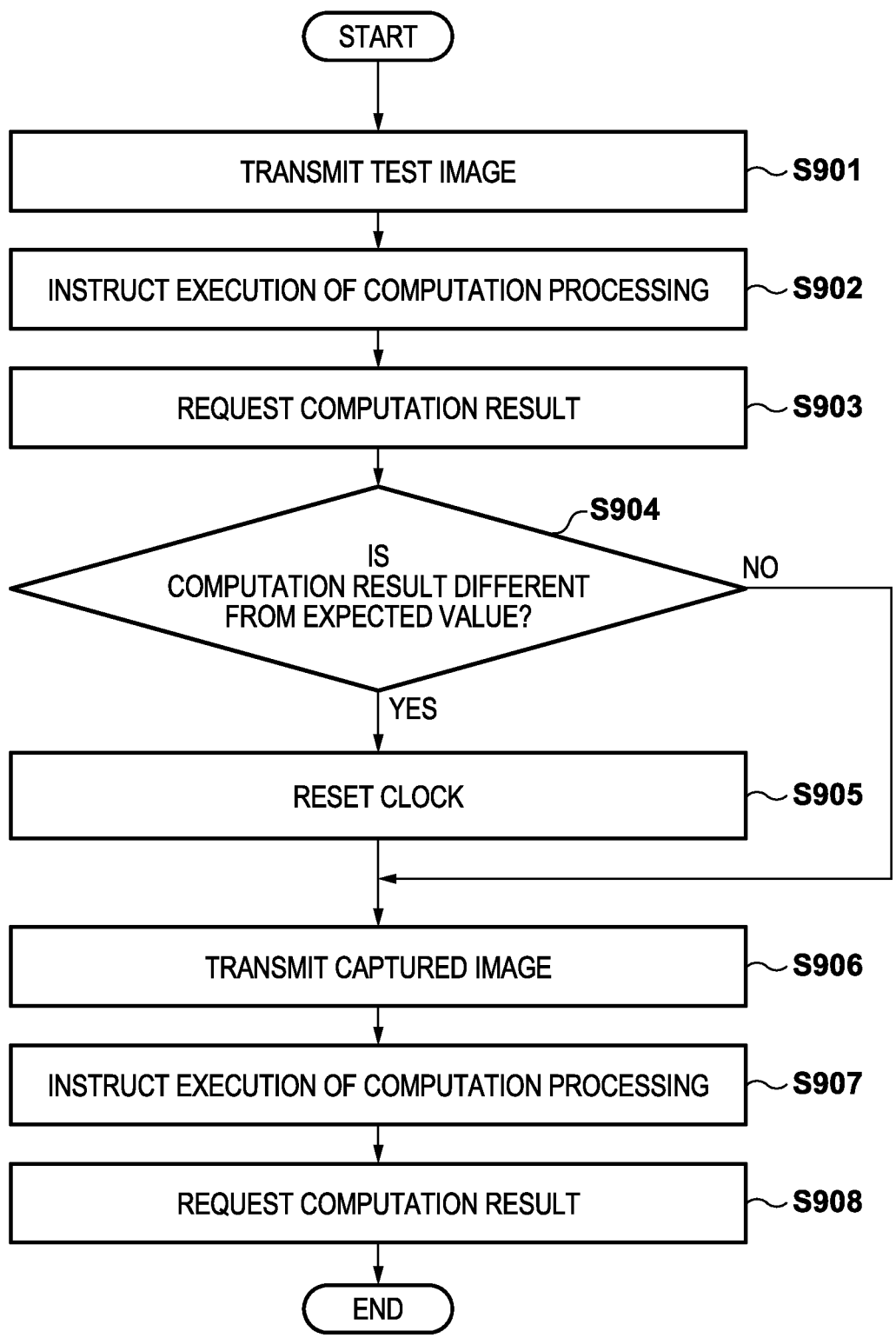
FIG. 9 is a flowchart illustrating an example of processing for resetting a clock signal for image processing based on a result of image processing on a test image corresponding to a third embodiment.

FIG. 9 is a flowchart illustrating an example of processing corresponding to the present embodiment. First, in step S901, a control unit 304 of the image capturing apparatus 110 transmits a test image stored in the storing unit 303 to the detachable device 100 via a device communication unit 306. In step S902 next, the control unit 304 of the image capturing apparatus 110 issues a command for instructing execution of computation processing to the detachable device 100 via the device communication unit 306, and in step S903, further issues a computation result output request command. Upon receiving the computation result transmitted from the detachable device 100 in response to the output request command, in step S904, the control unit 304 of the image capturing apparatus 110 determines whether or not the computation result acquired from the detachable device 100 matches the expected value obtained in advance. If it is determined that the computation result does not match the expected value in step S904, the processing is transitioned to step S905. In this case, it is estimated that the clock signal for processing is unstable, and therefore the device communication unit 306 of the image capturing apparatus 110 issues a clock resetting command to the detachable device 100. On the other hand, if it is determined that the computation result matches the expected value in step S904, the processing is advanced to step S906.

In step S906, the device communication unit 306 of the image capturing apparatus 110 transmits an image for processing to the detachable device 100, and in step S907 next, issues a request command for instructing execution of computation processing, and further in step S908, issues a command for requesting the computation result.

As described above, in the present embodiment, a case has been described in which computation processing on a test image is executed in advance to performing computation processing on a captured image on which an actual computation processing is to be performed, and the computation processing on the test image can be executed at a predetermined frequency. For example, the computation processing on the test image may be executed every time the number of images on which the computation processing has been executed matches a predetermined number, for example. Also, the computation processing on the test image may also be performed in a period in which the detachable device 100 is not performing computation processing (in an unoccupied time).

According to the present embodiment, it is possible to detect that computation processing in the detachable device 100 is not performed normally, based on a result of computation performed on a test image. Accordingly, in a case where a portion of a computation result is anomalous as well, other than the case where the computation result takes a fixed value such as 0x00 or 0xFF and the case where the computation result is not updated from the previous computation result, the anomaly in the computation processing can be detected. In the present embodiment, computation is performed using a test image for which an expected value of the computation result is known in advance, and therefore an anomaly in computation processing can be highly accurately detected, relative to the computation processing using a normal captured image, as in the case of the second embodiment.

Fourth Embodiment

Processing for Reducing Load in Image Capturing Apparatus

In the embodiments described above, a mode has been described in which computation processing in a detachable device 100 is caused to be normally performed by issuing a clock resetting command to the detachable device 100. In contrast, in the present embodiment, processing in an image capturing apparatus 110 for avoiding a stop situation of the clock signal supply will be described.

First, a factor for causing stoppage of clock signal supply from the image capturing apparatus 110 to the detachable device 100 includes a high load of the control unit 304 in the image capturing apparatus 110. Therefore, if similar processing as before is continued without resolving the high-load situation in the image capturing apparatus 110 after merely resetting the clock signal for computation in the detachable device 100, there is a risk that stoppage of clock signal supply will be repeated. Therefore, in the present embodiment, a situation is avoided in which stoppage of clock signal supply will be repeated by reducing the processing load in the image capturing apparatus 110. It is assumed that stoppage of clock signal for processing is detected using a result of computation on a captured image, similar to the flowchart of FIG. 8, for the sake of description below.

Figure 10:
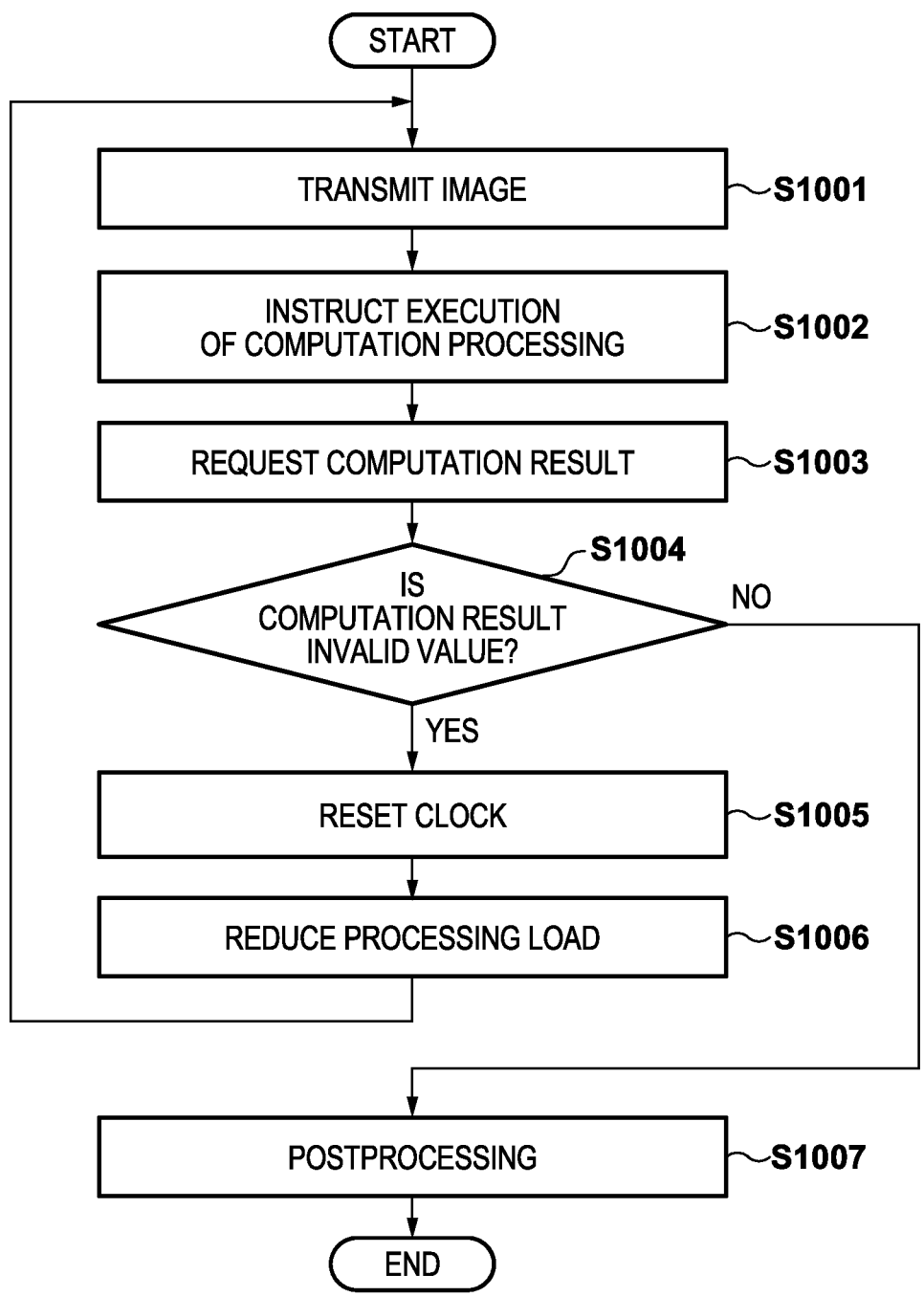
FIG. 10 is a flowchart illustrating an example of processing for adjusting a load of image processing in an image capturing apparatus based on a result of computation in a detachable device corresponding to a fourth embodiment.

The processing flow in the image capturing apparatus 110 corresponding to the present embodiment will be described with reference to FIG. 10. First, in step S1001, the control unit 304 of the image capturing apparatus 110 transmits a captured image for image processing to the detachable device 100 via the device communication unit 306. In step S1002 next, the control unit 304 of the image capturing apparatus 110 issues a command for instructing execution of computation processing to the detachable device 100 via a device communication unit 306, issues a command for requesting a computation result in step S1003, and acquires the computation result. In step S1004 next, the control unit 304 of the image capturing apparatus 110 determines whether or not the computation result output from the detachable device 100 is an invalid value. If it is determined that the computation result is an invalid value, the processing is advanced to step S1005. In step S1005, the control unit 304 of the image capturing apparatus 110 issues a clock resetting command to the detachable device via the device communication unit 306, and in step S1006, the control unit 304 of the image capturing apparatus 110 changes the settings such that the frequency of computation processing is reduced, and the processing in step S1001 and onward is again performed. On the other hand, if it is determined that the computation result is not an invalid value in step S1004, the processing is transitioned to step S1007 without reducing the processing frequency, and postprocessing is performed such as a computation result that is superimposed on an image being displayed.

A case has been described in which when an invalid value is detected in the computation result, the computation frequency in the image capturing apparatus 110 is immediately reduced. However, the frequency of computation processing may also be reduced when an invalid value is detected a certain number of times or at a certain frequency or more, depending on the embodiment.

Also, the load of the image capturing apparatus 110 may also be reduced by, not only reducing the frequency of computation processing in the image capturing apparatus 110, making a change such that a portion of the processing performed in the image capturing apparatus 110 is caused to be performed in the detachable device 100. Alternatively, the control unit 304 of the image capturing apparatus 110 may also perform notification control such that a user notification indicating that the processing load of the image capturing apparatus 110 has increased or for prompting a user to reduce the processing load is output (displayed) on the input/output apparatus 130. Examples of such a user notification include a notification for causing the load of the image capturing apparatus 110 to be reduced such as a proposal for reducing the number of streams to be distributed to a network or for reducing the region for which computation processing is performed.

In the present embodiment, by reducing the load in the image capturing apparatus 110, a situation can be avoided in which a high processing load state continues, and the clock signal supply is stopped at a high frequency, and as a result, the clock signal for processing can be effectively prevented from frequently becoming unstable in a short period of time.

The present invention is not limited to the above embodiments and various changes and modifications can be made within the spirit and scope of the present invention. Therefore, to apprise the public of the scope of the present invention, the following claims are made.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-013586, filed on Jan. 31, 2022, which is hereby incorporated by reference herein in its entirety.

What is claimed is:

1. An image capturing apparatus including a mounting part for enabling attachment and detachment of a device, comprising:
one or more processors; and
one or more memories storing executable instructions which, when executed by the one or more processors, cause the image capturing apparatus to perform operations including:
transmitting, in a state where a device having a function of executing analysis processing is attached to the mounting part, an image to the device;
transmitting, to the device, an execution instruction for executing the analysis processing on the image;
receiving a processing result of the analysis processing obtained according to the execution instruction,
determining whether to cause the device to reset a clock signal for processing that is used to execute the analysis processing, based on the processing result received from the device, and
transmitting, to the device, a command including a request for causing the device to reset the clock signal, in a case where it has determined, in the determining, that the device is caused to reset the clock signal.

2. The image capturing apparatus according to claim 1, wherein an image to be transmitted in the transmitting an image is an image captured by the image capturing apparatus, and
it is determined that the device is caused to reset the clock signal for processing in the determining, in a case where the processing result received from the device includes a predetermined value.

3. The image capturing apparatus according to claim 1, wherein an image to be transmitted in the transmitting an image is a first image for which a result of the analysis processing is previously known, and
it is determined that the device is caused to reset the clock signal for processing in the determining, in a case where a result of the analysis processing received from the device does not match the result of the analysis processing that is previously known.

4. The image capturing apparatus according to claim 3, wherein after the clock signal for processing has been reset based on a result of analysis processing performed on the first image, an image captured by the image capturing apparatus as the image is further transmitted in the transmitting an image, and an instruction for executing the analysis processing on the image is transmitted in the transmitting an execution instruction.

5. The image capturing apparatus according to claim 4, wherein in the transmitting an image, the first image in a period in which the device is not performing the analysis processing on an image captured by the image capturing apparatus is transmitted.

6. The image capturing apparatus according to claim 3, wherein in the transmitting an image, the first image at a predetermined frequency is transmitted.

7. The image capturing apparatus according to claim 1, wherein the one or more memories storing executable instructions which, when executed by the one or more processors, cause the image capturing apparatus to perform operations further including: executing processing regarding operations of the image capturing apparatus,
in at least any of a case where it has determined in the determining to cause the device to reset the clock signal for processing and a case where the command has been transmitted, a frequency of the processing regarding operations of the image capturing apparatus is reduced in the executing.

8. The image capturing apparatus according to claim 7, wherein when at least any of a case where it has determined, in the determining, to cause the device to reset the clock signal for processing and a case where transmission of the command is repeated predetermined times, the frequency of the processing regarding operations of the image capturing apparatus is reduced in the executing.

9. The image capturing apparatus according to claim 7, wherein in the executing, the frequency of the processing is reduced by assigning a portion of the processing under execution in the executing to the device.

10. The image capturing apparatus according to claim 7, wherein the one or more memories storing executable instructions which, when executed by the one or more processors, cause the image capturing apparatus to perform operations further including:
performing user notification regarding a load of the processing in the executing,
wherein the user notification is performed in the performing, when the frequency of the processing regarding operations of the image capturing apparatus is reduced in the executing.

11. The image capturing apparatus according to claim 1, wherein in a state where a device having a function of executing the analysis processing is attached to the mounting part, the command is transmitted to the device for causing the device to reset the clock signal for processing, prior to transmitting an instruction for executing the analysis processing on the image.

12. The image capturing apparatus according to claim 1, wherein the device generates the clock signal for processing from a clock signal supplied from the image capturing apparatus, and
the device resets the clock signal for processing in response to the request for clock resetting, and regenerates the clock signal for processing.

13. The image capturing apparatus according to claim 12, wherein the device is a downsized device in a form such that the entirety of or more than half of the device is inserted into the image capturing apparatus.

14. A control method of an image capturing apparatus including a mounting part for enabling attachment and detachment of a device, in a state where a device having a function of executing analysis processing is attached to the mounting part, the method comprising:
transmitting an image to the device;
transmitting, to the device, an execution instruction for executing the analysis processing on the image;
receiving a processing result obtained according to the execution instruction;

determining whether to cause the device to reset a clock signal for processing that is used to execute the analysis processing, based on the processing result received from the device; and transmitting, to the device, a command including a request for causing the device to reset the clock signal, in a case where it has determined, in the determining, that the device is caused to reset the clock signal.

15. A non-transitory computer-readable storage medium storing one or more program including instructions that, when executed by a processor of an image capturing apparatus including a mounting part for enabling attachment and detachment of a device and in a state where a device having a function of executing analysis processing is attached to the mounting part, cause the image capturing apparatus to perform:

transmitting an image to the device;

transmitting, to the device, an execution instruction for executing the analysis processing on the image;

receiving a processing result obtained according to the execution instruction;

determining whether to cause the device to reset a clock signal for processing that is used to execute the analysis processing, based on the processing result received from the device; and transmitting, to the device, a command including a request for causing the device to reset the clock signal, in a case where it has determined, in the determining, that the device is caused to reset the clock signal.

* * * * *